United States Patent
Koch et al.

(10) Patent No.: US 6,680,017 B1
(45) Date of Patent: Jan. 20, 2004

(54) DEVICE AND PROCESS FOR THE PRODUCTION OF PLASTICS/METAL COMPOSITE PANELS

(75) Inventors: Boris Koch, Wermelskirchen (DE); Hubert Goldbach, Ratingen (DE); Frank Krause, Bergisch Gladbach (DE); Jürgen Röhner, Köln (DE)

(73) Assignee: Bayer AG (DE)

( * ) Notice: Subject to any disclaimer, the term of this patent is extended or adjusted under 35 U.S.C. 154(b) by 0 days.

(21) Appl. No.: 08/745,813

(22) Filed: Nov. 12, 1996

(30) Foreign Application Priority Data

Nov. 21, 1995 (DE) .......................... 195 43 324

(51) Int. Cl.⁷ .................. B29C 47/20; B29C 47/06
(52) U.S. Cl. ................ 264/171.16; 264/171.21; 156/500; 425/505
(58) Field of Search .............. 264/171.16, 173.17, 264/171.21, 177.2; 156/244.27, 244.13, 244.14, 500; 428/412

(56) References Cited

U.S. PATENT DOCUMENTS

| | | | | |
|---|---|---|---|---|
| 3,668,288 A | * | 6/1972 | Takahashi .................. 264/566 |
| 3,815,216 A | * | 6/1974 | Brockway et al. ......... 264/45.9 |
| 4,057,944 A | | 11/1977 | Wyatt, Jr. et al. | |
| 4,181,556 A | * | 1/1980 | Fehlmann ............... 264/171.16 |
| 4,261,777 A | * | 4/1981 | Vetter et al. ........... 156/244.14 |
| 4,448,739 A | * | 5/1984 | Baus ....................... 264/173.1 |
| 4,554,123 A | * | 11/1985 | Smyth ................... 264/171.16 |
| 4,599,261 A | * | 7/1986 | Hart et al. .................. 428/213 |
| 5,030,488 A | * | 7/1991 | Sobolev ................. 156/244.27 |
| 5,190,803 A | | 3/1993 | Goldbach et al. | |

* cited by examiner

Primary Examiner—Mark Eashoo
(74) Attorney, Agent, or Firm—Connolly Bove Lodge & Hutz LLP (57) ABSTRACT

The invention relates to a device for the continuous production of plastics/metal composite panels, in particular those having hollow chambered sections, from thermoplastic polymers (3) and continuous metal sheets (6, 7), consisting of at least one plastics melting control system (1), calibrators (4, 5), feeds for the metal sheets (10, 11) and a draw-off unit (9), with the feeds for the metal sheets (10, 11) being arranged respectively above and below the melting control system (1) and the calibrators (4, 5) being immediately adjacent to the feeds (10, 11) and the melting control system (1).

8 Claims, 11 Drawing Sheets

DEVICE AND PROCESS FOR THE PRODUCTION OF PLASTICS/METAL COMPOSITE PANELS

BACKGROUND OF THE INVENTION

The invention relates to a device for the continuous production of plastics/metal composite panels, in particular those having hollow chambered sections, from thermoplastic polymers and continuous metal sheets. The device consists of at least one plastics melting control system having a melting nozzle, calibrators, feeds for the metal sheets and a draw-off unit, with the feeds for the metal sheets being arranged respectively above and below the melting control system and the calibrators being immediately adjacent to the feeds and the melting control system, in order that during the cooling down of the plastics melt the metal sheets are fixed with regard to their distances apart.

In various fields of technology such as, for example, the construction of housings, the construction industry generally or the automobile industry, endeavours are being made to develop panels and structural panels which on the one hand display the properties of metal panels, for example, steel panels, that is, a high load-bearing capacity at a high rigidity, and a high breaking strain. On the other hand, panels of this kind should at the same time have a low weight and if possible in addition other favourable properties such as, for example, a high heat insulating capacity. The above-mentioned desirable properties are possessed to a certain degree by some of the known plastics/metal composite materials.

Different variants of plastics/metal composites and the production thereof have become known. Deutsche Offenlegungsschrift DE 38 39 855 describes, for example, a plastics/metal composite consisting of a metal supporting structure in the form of a shell and reinforcing ribs made of thermoplastic polymers, which are extruded onto this metal shell. The composite maintains its particular rigidity and strength with regard to the transition between metal shell and thermoplastic material through the provision at various points on the metal shell of recesses, perforations, et cetera, into which the thermoplastic is secured by adhesion and by interlocking. A composite of two or more metal sheets together with thermoplastic, resulting in a hollow section, is not described in DE 38 39 855.

A disadvantage of this kind of composite structure is that it can only be manufactured by a discontinuous process and that it resorts to the use of a metal shell made from a single part.

The United States patent U.S. Pat. No. 4,057,944 describes a composite for thermal insulation comprising a metal covering made in two parts, reinforcing ribs made of plastics material and a filling for the voids consisting of a closed-cell polyurethane foam. Here the metal outer walls have grooves into which raised bosses on the plastics supports are inserted in order to connect the walls to the supports. The edges of the metal shells are connected to one another via a dovetailed groove with the edge of the second displaced to face the opposite plastics support.

The production of such panels is comparatively expensive, as the round key/slot connections are produced by the insertion of the plastics supports into the groove of the respective metal shell. To impart stability to the panel, it has in addition to be foamed. Methods for a continuous production of panels are not disclosed in the document U.S. Pat. No. 4,057,944.

DESCRIPTION OF THE INVENTION

The object of the present invention is to provide as simple a process as possible and a device which render possible the production by extrusion of hollow chambered sections consisting of at least two metal covering panels, wherein the sections possess a high rigidity, are highly load-bearing and have a good recovery behaviour, with the process being operable as far as possible by a continuous mode of operation.

The object is fulfilled according to the invention by a device for the continuous production of plastics/metal composite panels having at least two feeds for metal sheets supplied from holders, a guiding device for each sheet, a heatable melting control system including an extrusion nozzle for plastics melts, calibrators for the positioning of the metal sheets and for measuring the plastics webs as well as a draw-off unit for the final composite panel, with the feeds for these sheets being arranged respectively above and below the melting control system and the calibrators being immediately adjacent to the feed and the melting control system.

In a preferred embodiment of the device the extrusion nozzle is designed in the form of a slot nozzle for the production of plastics webs between the metal sheets.

The device preferably possesses in addition air-atomising nozzles in order, for example, to maintain the still hot plastics melt dimensionally stable between the metal sheets during the passage to the panel production unit.

The slot nozzle of the device may be constructed in the form of a nozzle having a multiple V-, X-, I-, T- or double-T shape, while any combinations of individual shapes is usable and is adapted and formed according to the field of application.

In a preferred variant of the device, the feeds for the metal sheets are provided with pressing rollers or pressure clamps, which render possible a preheating of the sheets prior to the contact with the plastics material and are optionally heatable.

In another preferred variant of the device according to the invention the feeds for the metal sheets run parallel, preferably horizontally at the same height, to the position of the metal sheets passing into the calibrator.

The calibrators act on the sheets particularly by magnetic force or under a partial vacuum in order to fix the sheets in their position relative to one another during the stage wherein the plastics webs are hardened.

In a further variant of the invention the feed of the plastics melt, which is delivered, for example, from an extruder, passes laterally out of the melting control system.

The invention also provides a process for the continuous production of plastics/metal composite panels (in particular of webbed panels) by melt extrusion of thermoplastic materials between at least two metal sheets, characterised in that at least two, optionally preheated, metal sheets are passed from a continuous supply continuously above and below a plastics extrusion nozzle, plastics material is extruded into the space between each of the two sheets in order to produce a webbed connection, in particular in the area of preformed perforations or notches in the sheets, and that during the cooling down of the plastics melt the sheets are fixed with regard to their distances apart as the continuous panel is drawn off.

The use of extruded hollow chambered sections as plastics/metal composite panels is in principle involved in all fields wherein high rigidity, high breaking strain and toughness (as in ductile steel), accompanied at the same time by low weight, are required. Examples which may be given are: roofing members, boards, scaffolding, loading planks, running boards, crash barriers, cable cars, base plates, bulkhead walls, parts of sliding doors, shelves, if necessary heat-insulating panels, et cetera.

By means of the device according to the invention there are obtained hollow chambered sections made of metal and thermoplastic material, which are bonded in the extrusion process in such a way that, particularly as a result of a carefully selected arrangement of metal sheets in the edge zones and plastics webs in the intermediate space, a rigid sandwich construction of high load-bearing capacity and possessing a low weight/performance ratio is formed. This composite panel obtainable by the process according to the invention finds application, for example, in the production of roofing members, boards, false floors, platforms, scaffolding, bus base-plates, as protection for the underside of lorries, loading planks, crash barriers, et cetera. The composite panel consists of a combination of two cold-worked thin-walled metal sheets, which in the extrusion process described are bonded to one another by plastics webs and maintained firmly at a distance apart. The connection between plastics material and metal can be effected chemically, by the known in principle system for the coating, for example, of "coil-coated" sheets, or by the separate addition of a bonding agent, for example, inside the extruder nozzle. In the latter case the coated metal sheets are led to the plastics melt in the extrusion head so that the heat energy of the melt causes the bonding agent to react and plastic and metal are brought into contact.

Another possibility consists in perforating and canaluring the metal sheets in various ways for the mechanical fastening of the plastics material. In this case the metal sheets are led to the plastics melt in the nozzle head, so that the melt flows through the perforations in the metal sheet and after solidification is permanently fastened in the metal sheet.

The metal sheets are optionally heated while being fed in. The calibrators may however optionally be cooled in order to accelerate the hardening of the plastics after their discharge from the extrusion nozzle.

Suitable plastics for carrying out the process according to the invention are all thermoplastic materials known in principle, in particular partly crystalline thermoplastics, preferably polyamide, in particular polyamide 6, polyesters, in particular polybutylene terephthalate, polypropylene, polycarbonate, in particular also the respective glass-fibre reinforced thermoplastics.

The invention also provides plastics/metal composite panels obtainable by the process according to the invention.

The invention is further explained below by way of example with the aid of the Figures. The details shown by the Figures are as follows:

EXAMPLES

Figure 1:
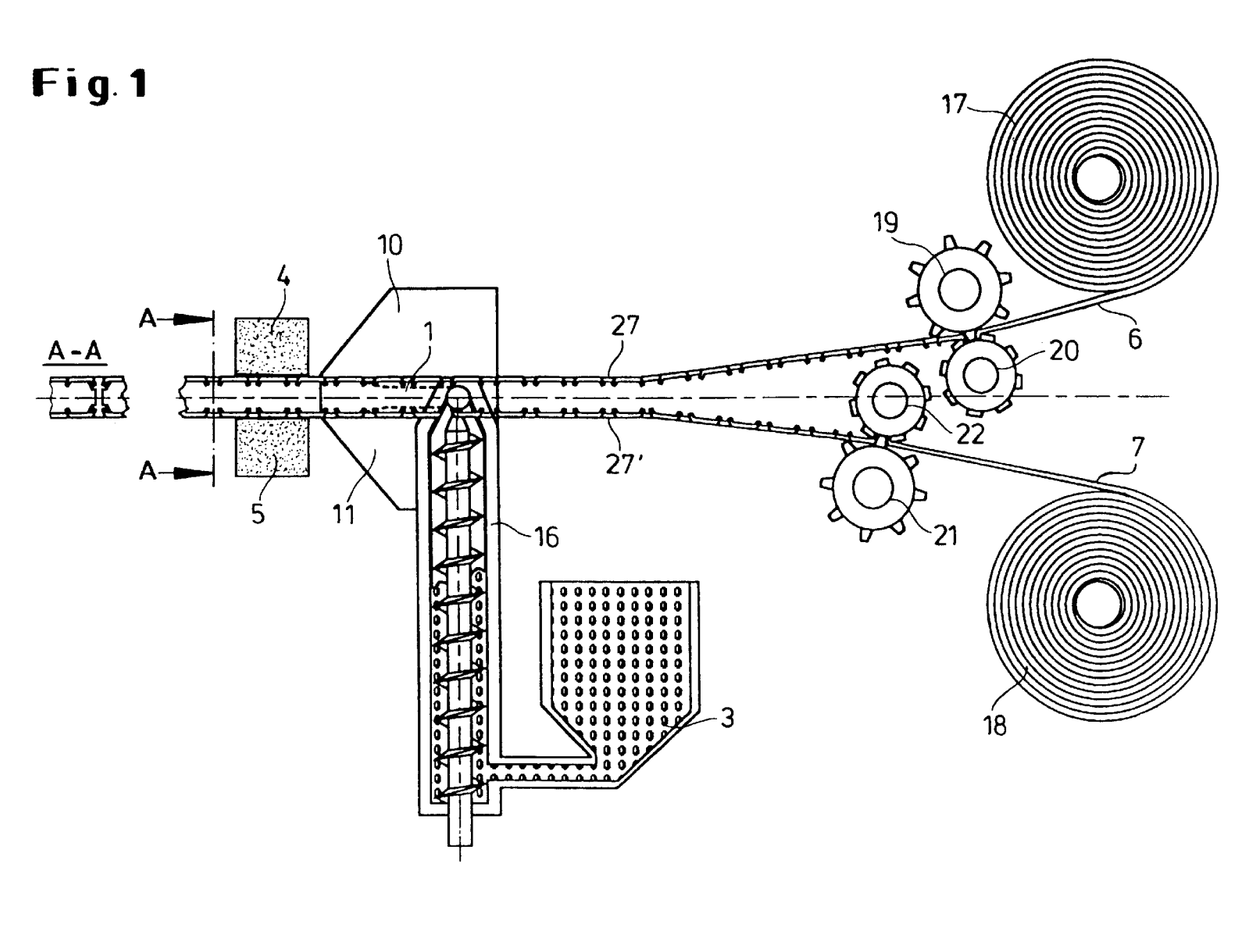
FIG. 1 A diagram of the device according to the invention in lateral view
Figure 2:
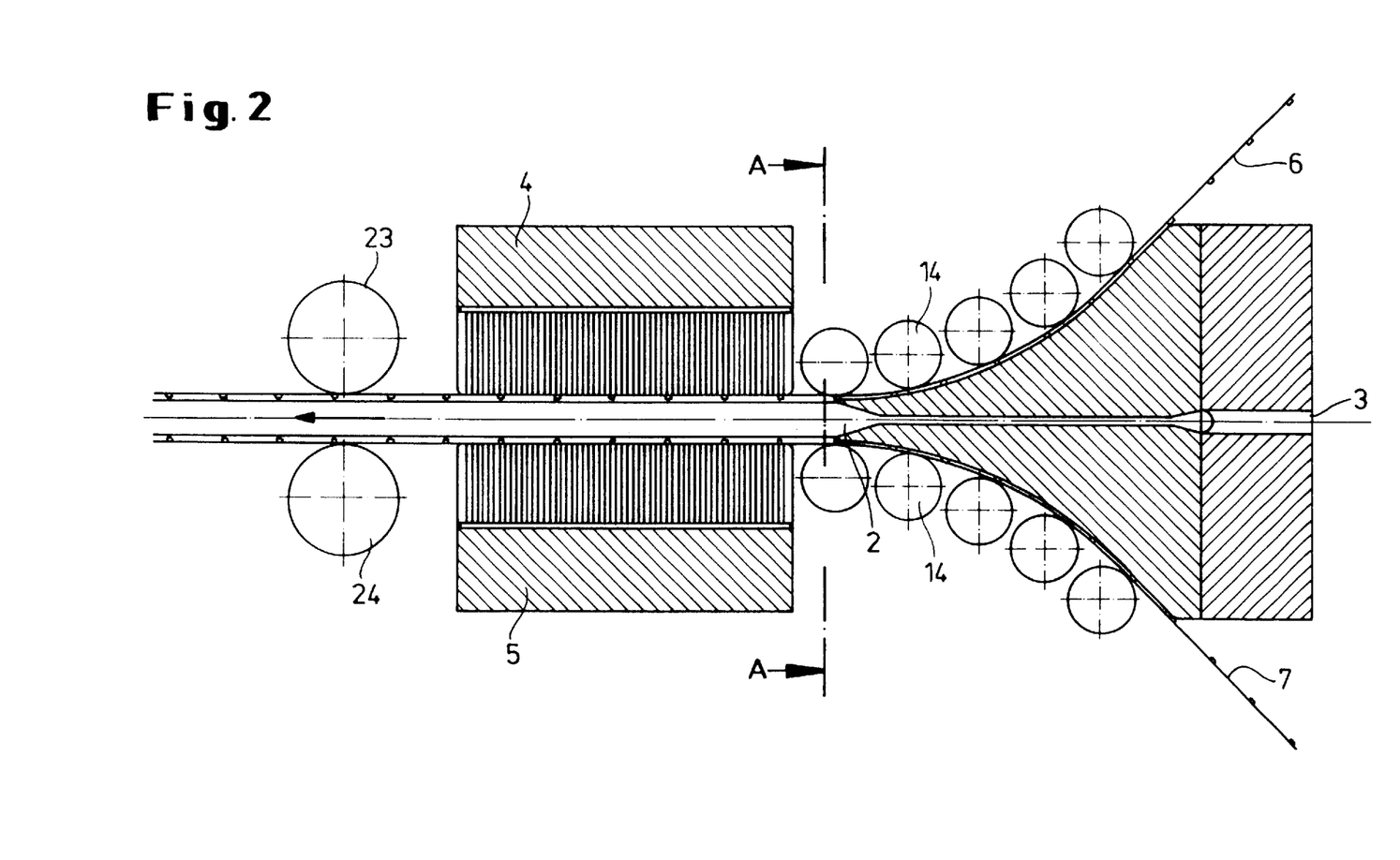
FIG. 2 A diagrammatic longitudinal section through a part of the device according to the invention with pressing rollers FIG. 3 A diagrammatic longitudinal section through a part of the device according to the invention with pressure clamps FIG. 4 A section corresponding to the line A—A in FIG. 2 through a device having X-shaped nozzles FIG. 5 A section as in FIG. 4 through a device having I-shaped nozzles FIG. 6 A section corresponding to the line B—B in FIG. 3 through a device having X-shaped nozzles FIG. 7 A section as in FIG. 6 through a device having I-shaped nozzles FIG. 8 A longitudinal section through a variant of the device according to the invention with lateral feed of the plastics melt FIG. 9 A section corresponding to the line C—C in FIG. 8 through a device having X-shaped nozzles FIG. 10 A section as in FIG. 9 through a device having I-shaped nozzles FIG. 11 A perspective view of a metal-plastics composite panel produced by means of the device shown in FIG. 4 or FIG. 6

Proceeding from two dispensing rolls 17, 18 made of sheet steel (thickness 0.5 mm) the sheets are drawn onto two pairs of perforating rollers 19, 20 and 21, 22 and there perforated with circular holes 27, 27' (see FIG. 1). The sheets 6, 7 are transported further by the easily heated pressure rollers 14, 14' and passed to the nozzle head of the extrusion nozzle 2. Thermoplastic glass-reinforced material (polyamide 6) is ejected from the extruder (not shown) through the melting channels 25 of the nozzle 2 and connects in the region of the perforations 27, 27' with the internal sides of the sheets 6, 7. The steel sheets are subjected to suction on their upper side by means of a partial vacuum from the calibrators 4, 5 and are drawn parallel to one another, until at the end of the calibrators 4, 5 the plastics melt 3 has to a large extent cooled down. During the passage to the extrusion process the air-atomising nozzles 12 are charged with compressed air of about 3 bar in order to prevent the extruded shaped supports from collapsing and bonding together (see FIG. 4). The final composite panels are led away by transporting rollers 23, 24 for further processing.

Figure 3:
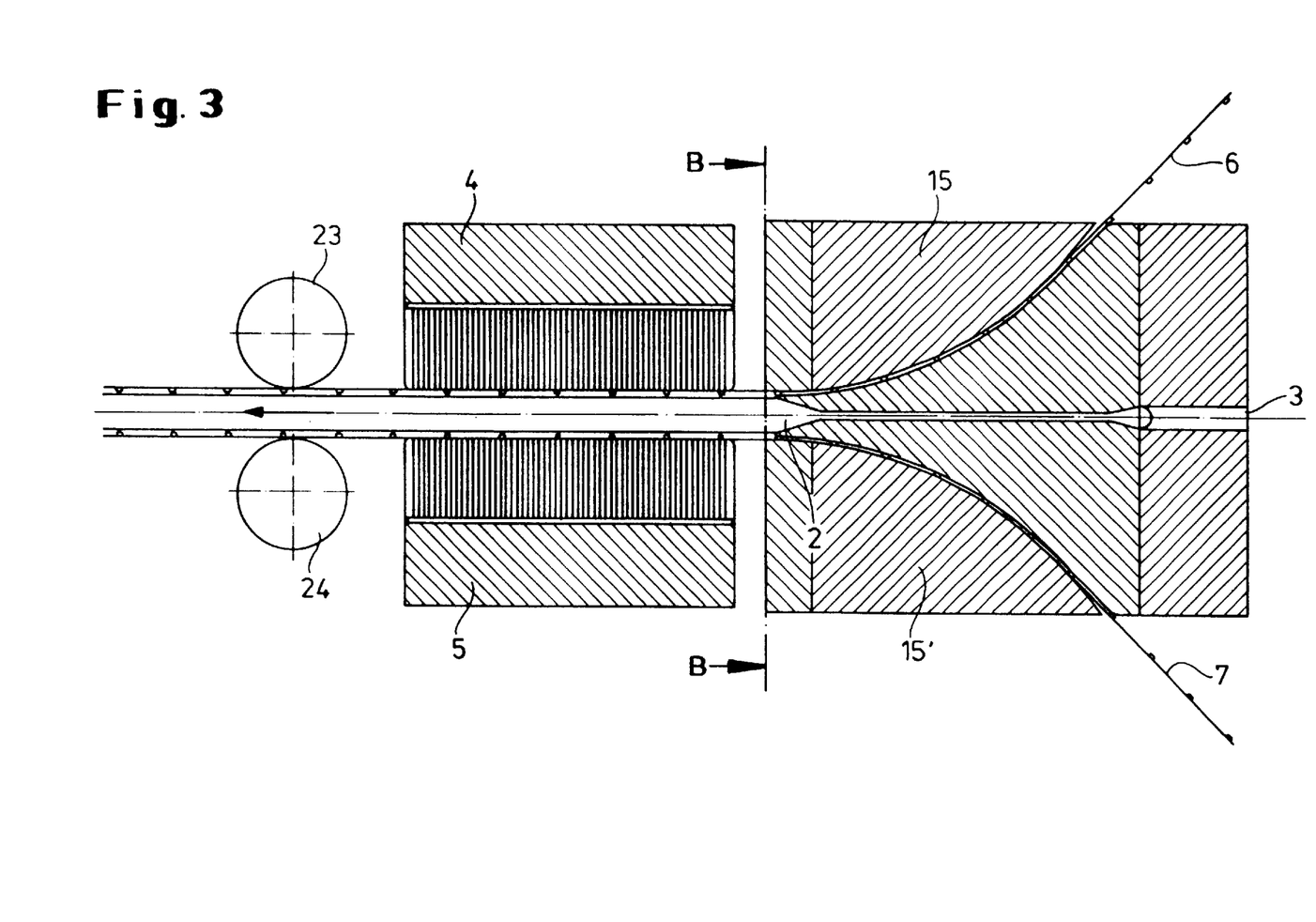

The use of pressure clamps 15, 15' instead of the pressing rollers 14, 14' permits a more even preheating of the steel sheets 6, 7 (see FIG. 3).

Figure 8:
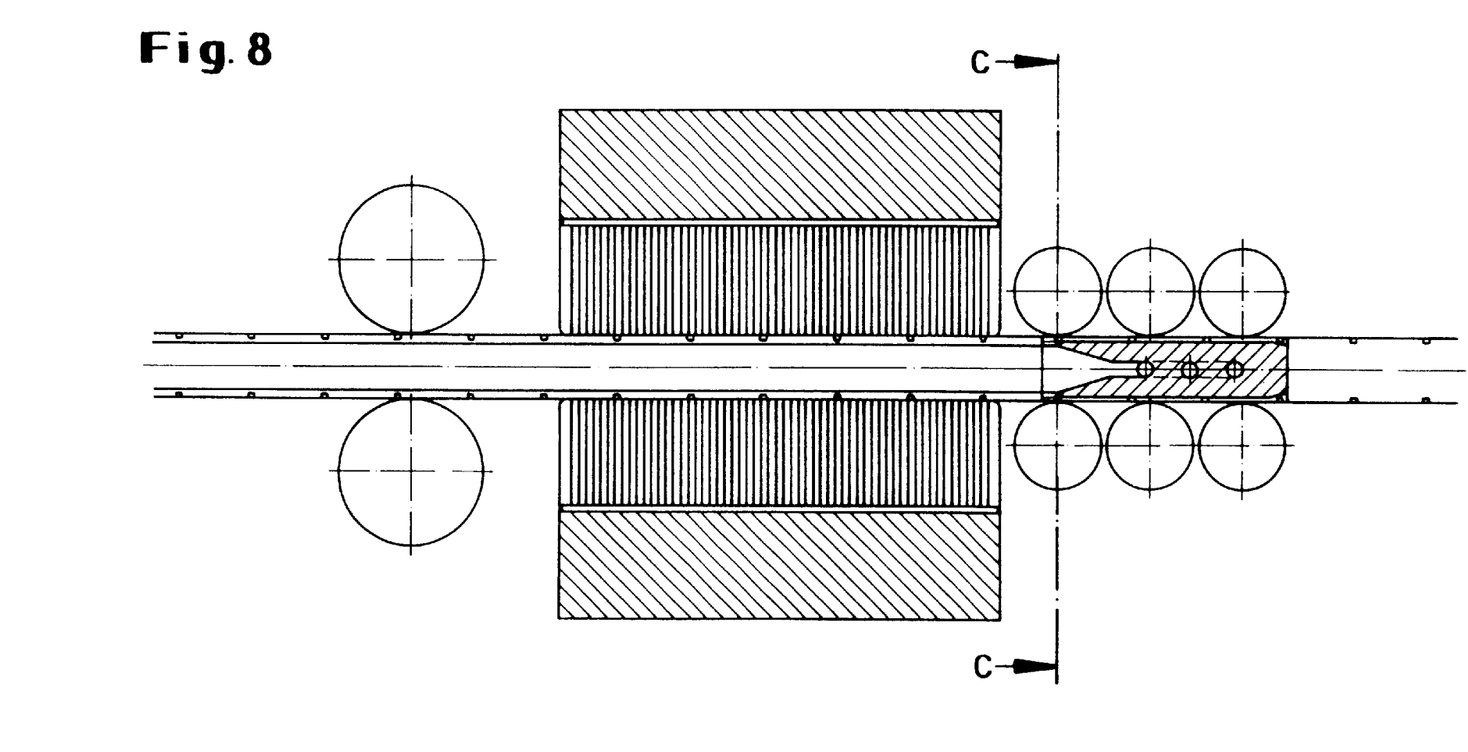

Using a lateral feed of the plastics material 3 from the extruder (corresponding to FIG. 8), it is possible to organise the feed for the metal sheet in such a way that the sheets 6, 7 are fed accurately in the vertical position, in which they are fixed by the calibrators 4, 5. By this means a deformation of the sheets as a result of a preset bending radius around the region of the sheet feed is avoided; this deformation can occur particularly in the region of the calibrators 4, 5 in the vicinity of the nozzles.

Figure 4:
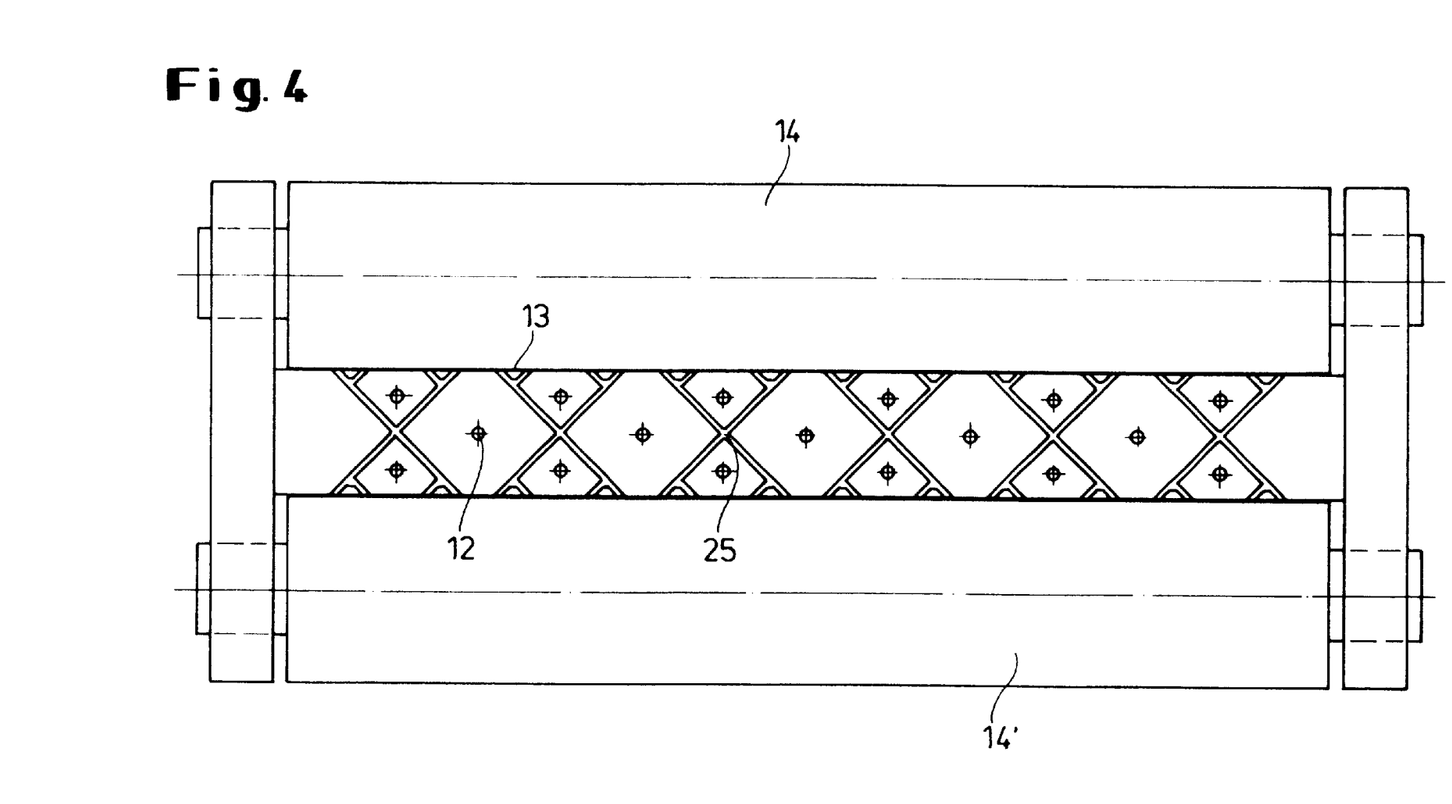
Figure 6:
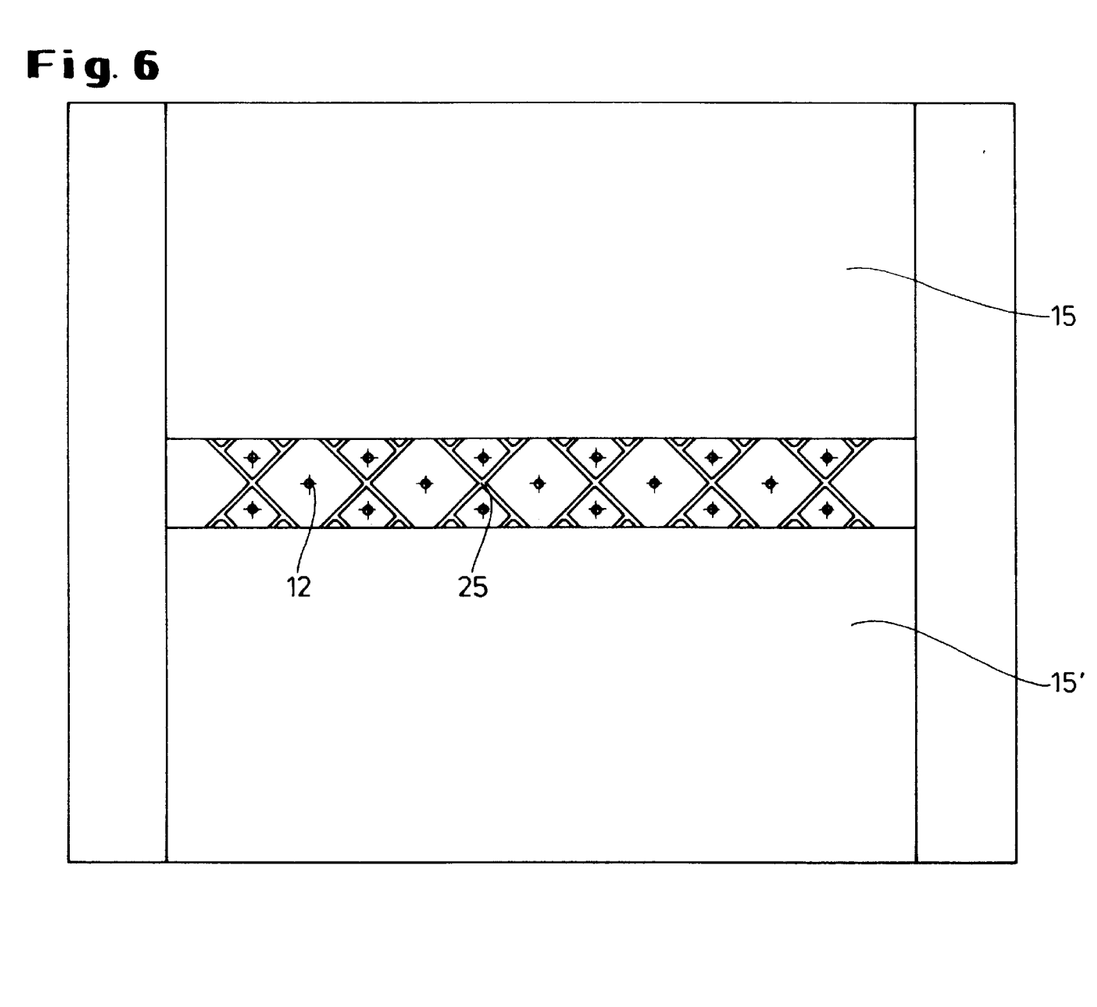
Figure 9:
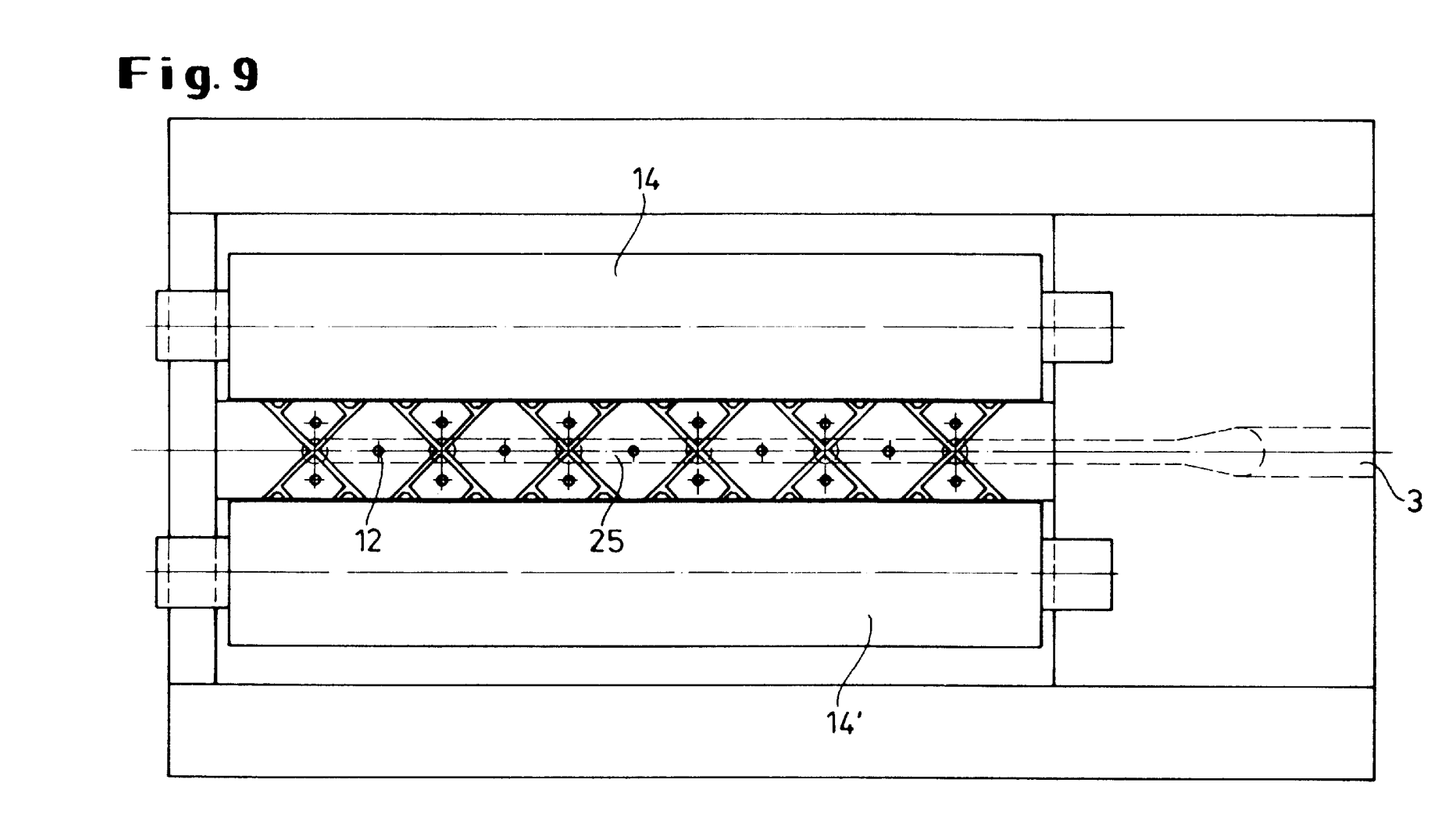

The X-shaped panels which can be produced using the nozzles according to FIG. 4, 6 or 9 display particularly good mechanical properties, in particular when subjected to surface loads.

Figure 5:
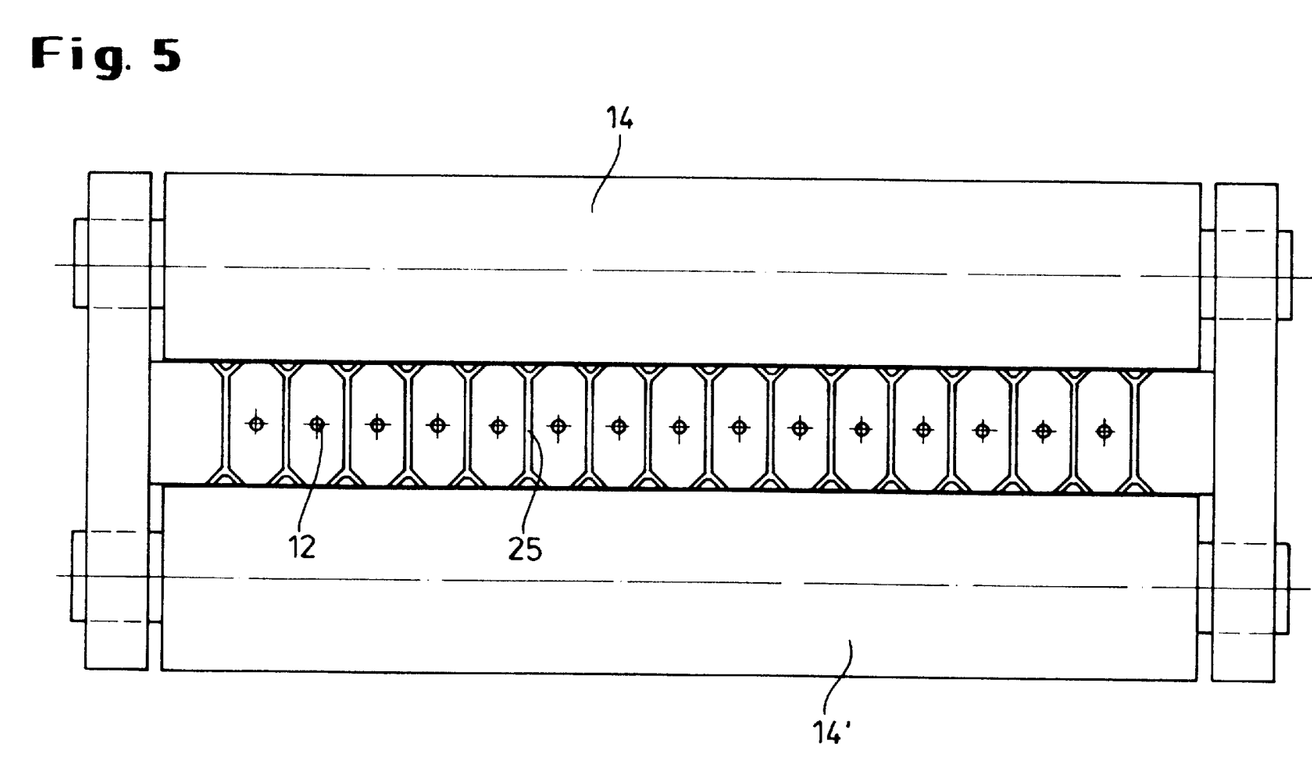
Figure 7:
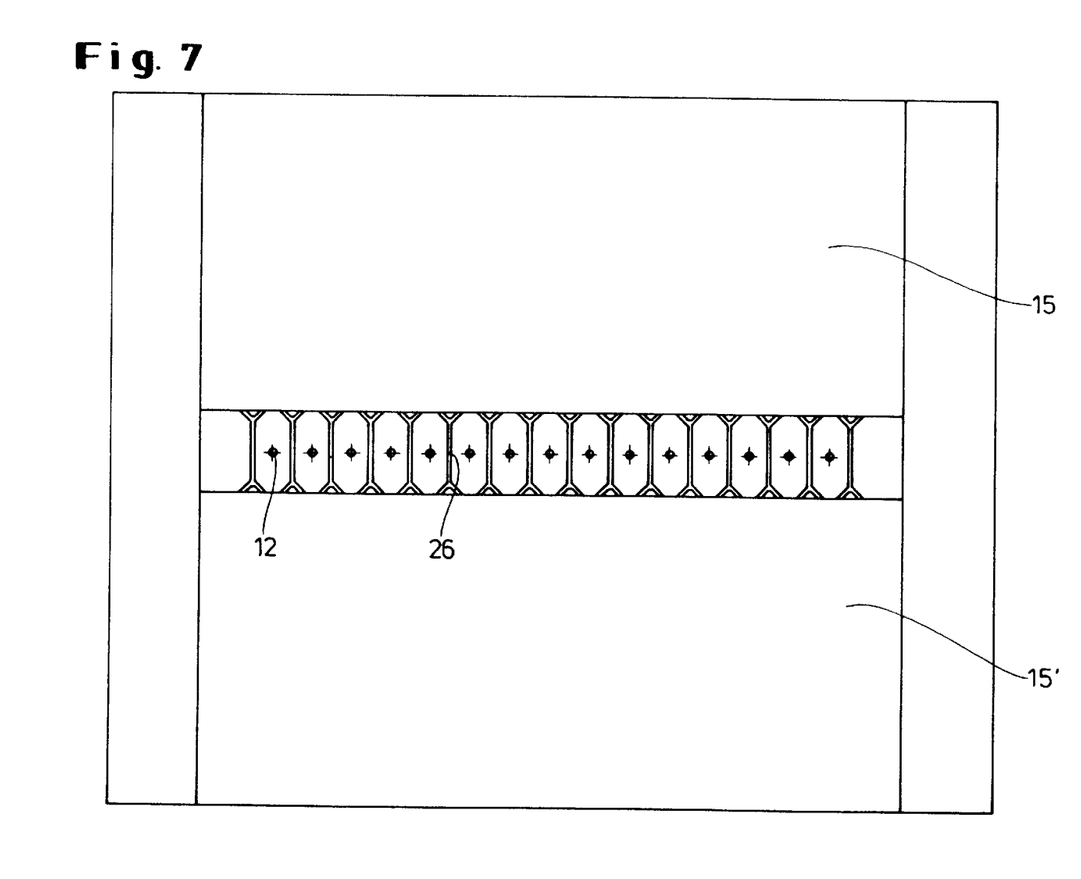
Figure 10:
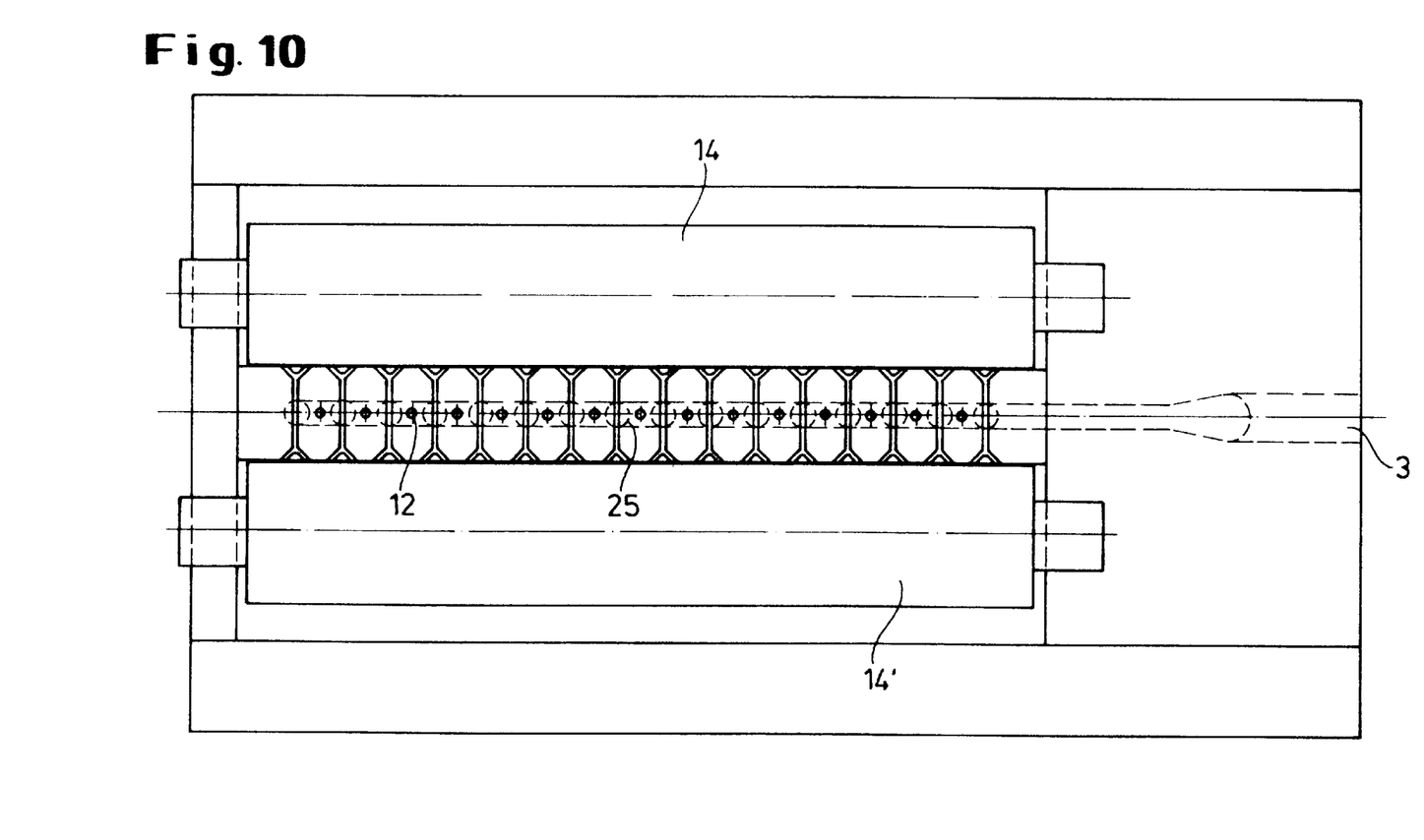
Figure 11:
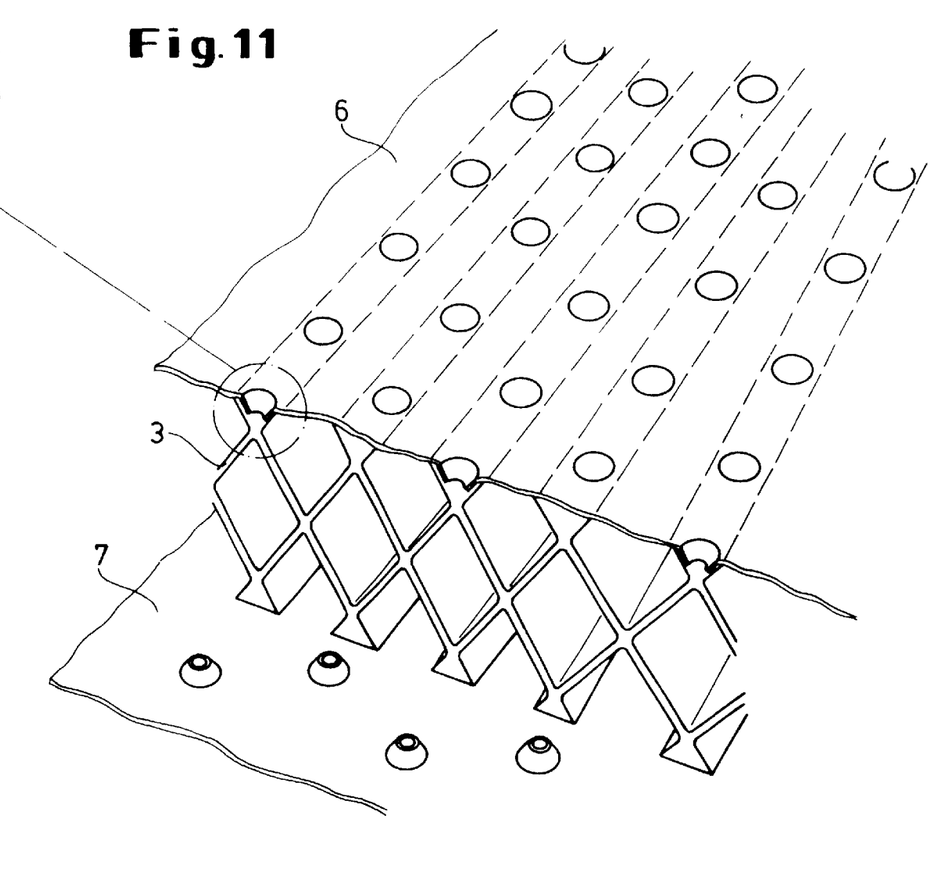
Figure 12:
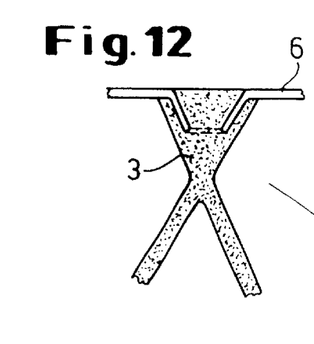
FIG. 12 An enlarged detail taken from FIG. 11 in the region of a perforation in the metal

The I-shaped panels which can be produced using the nozzles according to FIG. 5, FIG. 7 or FIG. 10 display an exceptional mechanical quality under bending stress longitudinally to the plastics webs.

What is claimed is:

1. A process for the continuous production of plastics/metal composite panels, by melt extrusion of thermoplastic polymers between at least two metal sheets, comprising the steps of:

supplying at least two metal sheets, at least two feeds for the metal sheets, one for each sheet, and at least two perforating rollers;

perforating at least two metal sheets with the at least two perforating rollers;

continuously guiding at least two, optionally preheated by pressing rollers or pressure clamps, metal sheets with perforations therein, each from a holder one above and the other below a plastics extrusion nozzle, to a heatable melting control system and positioning the metal sheets with perforations in spaced relationship from one another with calibrators, wherein the calibrators are arranged immediately adjacent the feeds ant the melting control system;

extruding plastics material into the space between each of the two sheets in order to produce a webbed connection in the area of the perforations in the sheets;

cooling down of the plastics melt, and fixing the sheets with regard to their distances apart as the continuous panel is drawn off.

2. A device for continuously producing a plastics/metal composite panel comprising:

a supply of at least two metal sheets, at least two feeds for the metal sheets, one for each sheet;

at least two perforating rollers, one for each sheet for introducing perforations therein;

a heatable melting control system including an extrusion nozzle for introducing a plastics melt between the sheets and through the perforations;

guiding means for guiding each sheet to the heatable melting control system;

calibrators for positioning the metal sheets in spaced relationship from one another;

a draw-off unit for removing the composite plastics/metal panel;

wherein the feeds for the metal sheets are arranged with one feed above and the other below the melting control system;

and wherein the calibrators are arranged immediately adjacent the feeds ant the melting control system and wherein the feeds are provided with pressing rollers, or pressure clamps which render possible a preheating of the sheets prior to contact with the plastic melt and are optionally heatable.

3. The device according to claim 2, characterized in that the extrusion nozzle is design in the form of a slot nozzle for the production of plastics webs between the metals sheets.

4. The device according to claim 3, characterised in that the slot nozzle is constructed in the form of a nozzle having a multiple V-, X-, I-, T- or double-T shape.

5. The device according to claim 2, characterized in that the extrusion nozzle possesses in addition air-atomising nozzles.

6. The device according to claim 2, characterised in that the feeds run parallel to the position of the sheets passing into the calibrators.

7. The device according to claim 2, characterised in that the calibrators act on the sheets by magnetic force or under a partial vacuum.

8. The device according to claim 2, characterised in that the feed of the plastics melt passes from an extruder laterally out of the melting control system.

* * * * *

UNITED STATES PATENT AND TRADEMARK OFFICE
CERTIFICATE OF CORRECTION

PATENT NO.    : 6,680,017 B1
DATED         : January 20, 2004
INVENTOR(S)   : Boris Koch et al.

It is certified that error appears in the above-identified patent and that said Letters Patent is hereby corrected as shown below:

Column 6,
Line 13, "design" should read -- designed --.

Signed and Sealed this

Eighteenth Day of May, 2004

JON W. DUDAS
*Acting Director of the United States Patent and Trademark Office*